United States Patent [19]
Sorathia et al.

[11] Patent Number: 5,337,288
[45] Date of Patent: Aug. 9, 1994

[54] ACOUSTIC AND VIBRATION ATTENUATION COMPOSITE MATERIAL

[75] Inventors: Usman A. Sorathia, Arnold; Joseph W. Killian, Centreville; Andrew W. Jarrett, Arnold, all of Md.

[73] Assignee: The United States of America as represented by the Secretary of the Navy, Washington, D.C.

[21] Appl. No.: 954,805

[22] Filed: Sep. 30, 1992

[51] Int. Cl.$^5$ .............................................. H04K 3/00
[52] U.S. Cl. ........................................ 367/1; 181/207
[58] Field of Search .................. 367/1; 181/207, 233, 181/249, 271, 294, 208, 290; 428/161; 252/62; 244/119

[56] References Cited

U.S. PATENT DOCUMENTS

3,160,549  12/1964  Caldwell et al. .................... 181/207

*Primary Examiner*—Daniel T. Pihulic
*Attorney, Agent, or Firm*—Gary G. Borda

[57] ABSTRACT

The present invention relates to acoustic and vibration attenuation composite material, particularly to damping tiles of the Type VI class 1, suitable for use in aircraft, ship and submarine applications, that is inexpensive, does not result in an unacceptable weight penalty, and is conformable-in-place to complex curvatures. The present acoustic and vibration attenuation composite comprises a constraining layer of at least one ply of graphite fabric together with curable phenolic resin bonded to a viscoelastic layer.

7 Claims, 9 Drawing Sheets

FIG. 9

ACOUSTIC AND VIBRATION ATTENUATION COMPOSITE MATERIAL

FIELD OF THE INVENTION

The present invention relates to acoustic and vibration attenuation composite constraining material, more particularly to damping tiles of the Type VI Class 1, suitable for use in aircraft and naval vessels.

BACKGROUND OF THE INVENTION

Certain acoustic and vibration attenuation techniques have focused on "add-on" viscoelastic damping treatments.

Add-on viscoelastic damping treatments as specified in MIL-STD-2148(SH) and MIL-P-23653C can add substantial weight to machinery foundations, bulkheads and other ship structures. For relatively light steel structures (i.e. less than ¾ thick), there is enough vibration induced strain in a free layer viscoelastic add-on treatment to dissipate vibration effectively. For heavier structures the viscoelastic must be stressed in shear to get enough induced strain to dissipate vibration energy effectively. Thus for considerations of weight, a light weight, high bending stiffness constraining layer is required in a shear damping treatment.

Weight is not the only consideration in developing a successful add-on damping treatment. Material and installation cost, fire performance, toxicity, etc. are important additional constraints on the selection of an operational system.

Type VI Class 1 and Class 2 damping tiles are intended as light-weight damping substitutes for Type II Class 1 and Class 2 damping. The Type VI Class 1 damping tile having a constraining layer and a substrate was developed to replace the Type II Class 1 damping tile in an effort to achieve weight savings.

Currently, Type VI damping is specified as either a single layer of viscoelastic material or as a layer of viscoelastic material with a reinforced laminate cover bonded to it. The laminate cover is bonded to the viscoelastic material at the factory.

In one application, a somewhat light weight shear damping treatment (designated Type VI) was developed for submarines. The treatment consisted of using pre-fabricated Type VI damping tiles pre-configured to match the surface of the substrate to be damped. In such application, a viscoelastic material integrally is bonded to a pre-configured composite constraining layer consisting of Kevlar and graphite fiber materials in a bismaleimide (BMI) high-temperature-cure resin matrix (hereinafter "BMI Type VI damping tiles").

However, the aforementioned BMI Type VI damping tiles have inherent disadvantages which detract from their being accepted as an adequate substitute for Type II tiles. The BMI Type VI damping tiles are too costly from both a material and installation standpoint. The bismaleimide (BMI) resin used in the constraining layer is relatively expensive ($20–30/lb). In addition, the BMI Type VI damping tiles cannot be conformed-in-place during installation. These tiles are rigid and do not readily conform to curved surfaces.

In practice, BMI Type VI damping tiles must be procured in the form of pre-made damping tiles with specific contour and curvature and this substantially increases their cost. Effective damping performance requires the damping material and the structure, i.e. substrate, being damped to be in intimate contact with each other. On curved structures this is accomplished with Type II tiles by warming them slightly so they become pliable and then pressing them onto the surfaces to be damped. However, the stiff cured laminate cover of the pre-fabricated BMI Type VI damping tiles precludes this installation process. Therefore, whenever such BMI Type VI damping tiles are installed on contoured surfaces, such tiles must be procured with a matching curvature. Alternately, the flat BMI Type VI damping tiles can be cut into smaller pieces and then the pieces can be arranged, like a jig saw puzzle, onto the contoured surfaces. Alternatively, in the conventional BMI Type VI damping tile, the BMI-containing constraining layer can be pre-molded to a pre-determined curvature during the curing procedure. However, this is expensive since such molding must take place at high temperatures and high pressures in an autoclave. Still further, the BMI Type VI reinforced laminate cover, i.e. constraining layer, is difficult to cut and requires the use of a specialized band saw or water jet cutting tool. The cut edges must also be resealed with a resin to prevent moisture from wicking along the fiber structure of the laminate, particularly those based on Kevlar. This difficulty in cutting the laminate cover coupled with the need to reseal to cut edge further increases installation costs of BMI Type VI damping tiles.

In short, a Type VI damping tile which is relatively facilely installed, is cheaper to produce, and has effective acoustic and vibration damping properties has been sought in order have a truly cost-effective operational system. The present invention satisfies that need.

SUMMARY OF THE INVENTION

The present invention provides an acoustic and vibration attenuation composite comprising a composite constraining layer of at least one ply of graphite fabric and curable phenolic resin bonded to a viscoelastic layer which comprises a rubber material.

The present acoustic and vibration attenuation composite is more cost-effective than a composite having a bismaleimide-based constraining layer.

The present acoustic and vibration attenuation composite is readily conformable to curved surfaces.

The present acoustic and vibration attenuation composite provides conform-in-place capability during installation of the composite.

The present acoustic and vibration attenuation composite does not require a pre-fabrication or pre-cure at elevated temperatures and pressures, e.g. autoclaving.

The present acoustic and vibration attenuation exhibits fire resistance.

The present acoustic and vibration attenuation composite exhibits mechanical properties comparable to the cost-ineffective composite having a bismaleimide-containing constraining layer.

The present acoustic and vibration attenuation composite provides acoustic and vibration damping equal to or better than the known cost-ineffective composite having a bismaleimide-based constraining layer.

DETAILED DESCRIPTION OF THE INVENTION

The present invention relates to acoustic and vibration attenuation composite material, particularly to damping tiles of the Type VI class 1, suitable for use in aircraft, ship and submarine applications, that is inexpensive, does not result in an unacceptable weight penalty, and is conformable-in-place to complex curvatures.

The present invention provides an acoustic and vibration attenuation composite comprising a composite constraining layer of at least one ply of graphite fabric and curable phenolic resin bonded to a viscoelastic layer which comprises a rubber material.

Installation of the viscoelastic material is readily accomplished and is as easy to cut and preform as Type II material.

The graphite fabric, i.e. cloth, for the constraining layer can be cut to fit large surface areas with shears or electrically operated rotary blades. If the viscoelastic material has been preformed to a curved surface, the fiber cloth will conform readily to it. The graphite fiber cloth and room temperature cure resin are laid-up on the viscoelastic material in layers to build up a requisite thickness. Damping treatment installation is complete upon cure of the constraining layer and bonding of the constraining layer to the viscoelastic layer.

After layering-up, but before complete curing, the fiber volume fraction of the constraining layer can, if desired, be increased. For instance, pressure can be applied to the composite material to squeeze out air trapped within the constraining layer. Or, with smaller items, a technique known as vacuum bagging can be applied.

Phenolic resins as a class are suitable for use in the present invention. As is known to those skilled in the art, phenolic resins are the reaction product of at least one member of the class of phenolics with at least one of the aldehydes. Exemplary useful phenolic resins have viscosities suitable for application by spray or hand layering, such as, for instance, from about 300 cps to about 3000 cps, preferably about 300 cps to about 2000 cps. Illustrative suitable commercially available phenolic resins are acid-catalyzed resins such as Cellobond Resin J2018L (BP Chemicals) and Cellobond Resin J2027L (BP Chemicals) and base-catalyzed resins such as Mark V and Mark VII (ATS Products, Inc.) and Fire PRF$_2$ 1000 LD (Indespec Chemical Corporation). The latter two are two component phenol-resorcinol-formaldehyde resins. The phenolic resin in the constraining layer preferably is curable in the range of 15° C.–32° C. in order to obtain optimal damping characteristics in certain submarine applications.

The graphite fabric provides fiber reinforcement in the present acoustic and vibration attenuation composite. The fabric is present in at least one ply, although, preferably, a multi-ply fabric reinforcement can be used. In multi-ply embodiments, the fabric is preferably arranged to yield a quasi-isotropic arrangement. For instance, an 8-ply fabric, in a stacking sequence of $(0/45)_{2S}$, provides a quasi-isotropic fabric pattern in the composite constraining layer. An acoustic and vibration attenuation composite having such a constraining layer provides advantageous results. Plus woven graphite fabrics are preferred.

Graphite fabric having a high modulus is preferable, and an exemplary range is from about 30 million to about 80 million modulus. An exemplary commercially available graphite fabric is PAN based, IM-7 graphite, 5 HS weave, 10.7 oz/square yard, available from Hercules Advanced Material Systems Company.

The thickness of the composite constraining layer is not critical per se, and can range, for instance, upwards from about 0.25 cm to about 1.3 cm. For certain submarine applications, a thickness of about 0.50 cm to about 0.75 cm is preferred. The thickness can, if desired, be greater than about 1.3 cm, depending on the vibration frequencies to be damped and the thickness of the viscoelastic layer. The constraining layer thickness selected relates generally proportionally to the thickness of the viscoelastic layer.

The thickness of the viscoelastic layer is not critical per se, and can range, for instance, from upwards of about 0.5 cm to about 0.8 cm, or more depending on the vibration frequencies to be damped and the thickness of the constraining layer. Advantageous results in certain applications in submarines can be obtained at a thickness of about, for instance, 0.60 cm to about 0.65 cm.

The viscoelastic layer comprises a rubber, such as a nitrile rubber. A useful rubber composition comprises a nitrile rubber, carbon black, and additives such as an antioxidant, a curing agent, and an activator. An exemplary rubber composition comprises 100 parts by weight of a nitrile rubber (e,g. Paracri/CLT from Uniroyal, Inc.), 40 parts by weight of carbon black (e.g. Philblack N-358, Ashland Chemical Company), 0.5 parts by weight of an antioxidant (e.g. AGE RITE RESIN D, R. T. Vanderswielt Co., Inc.), 5.0 parts by weight of zinc oxide (e.g., Protox 166, New Jersey Zinc Co.), 1.0 parts by weight of an activator (e.g. a carboxylate such as stearic acid), 3.0 parts by weight of a curing agent (e.g. Vul Cup 40 KE, Hercules, Inc.).

The composite constraining layer can be suitably bonded to the viscoelastic layer to obtain the present acoustic and vibration attenuation composite. The use of an adhesive is not required, although, if desired, one can be used.

Various techniques for carrying out a conform-in-place process for applying the present acoustic and vibration attenuation composite material can be usefully employed. One such procedure comprises preparing the surface of the substrate to be attenuated; applying a suitable adhesive coating to the thus prepared substrate surface, and, if necessary, chemically treating, such as cleaning, a first surface of a viscoelastic layer; applying the first surface of a viscoelastic layer to the prepared substrate surface; chemically treating, if desired, a second surface of the viscoelastic layer; layering curable phenolic resin and graphite fabric ply on the second surface to form a constraining layer; and allowing the curable phenolic resin to cure.

In another embodiment, the adhesive coating can be applied to the first surface of the viscoelastic layer instead of, or in addition to, the prepared substrate surface.

In a further embodiment, a ply of graphite fabric can be pre-laid-up with the selected curable phenolic resin and then applied to the second surface of the viscoelastic layer.

Substrate surface preparation for metal surfaces involves, if necessary, sand blasting, and applying a primer paint to the sand-blasted surface.

Suitable adhesive coatings include, for instance, commercially available epoxy adhesives such as TA-30 (Philadelphia Resins) and E241IN (Fusor Corp.) or 306 (Lord Corporation), as well as others meeting MIL-A-24456.

Surface and, if desired, chemical treatment of a first surface of the viscoelastic layer comprises buffing or sanding, i.e. topically abrading, the surface and optionally chemically treating the thus-abraded surface. Chemical treatment can, if desired, be effected by applying halogenated hydrocarbons, such as 1,1,1-trichloroethane, to the abraded surface.

A first surface of a viscoelastic elastic layer is bonded to the prepared substrate surface via an above-described curable coating, and, preferably, the adhesive coating is allowed to cure for about 24-48 hours before a constraining layer is laid-up on the second surface of the viscoelastic layer. In a preferred embodiment, a first surface of a viscoelastic layer is applied to and adhered to the substrate, such as a surface of a submarine ballast tank. Thereafter, a second surface of viscoelastic layer is roughed, i.e. topically abraded, whereupon, the thus roughened surface is chemically surface treated with, for example, a solvent-based surface conditioner vulcanized or thermoplastic polymeric materials (for instance, Chemlock 7701 or TS 3135-57, Lord Elastomer Products). Thereafter, the solvent present in the surface conditioner is flashed-off, and a chemical coupling agent is applied to the roughened and chemically treated surface of the viscoelastic layer. The constraining layer is conformed-in-place—i.e. laid-up—upon the thus prepared surface of the viscoelastic layer.

Various chemical coupling agents can be used. An aminoalkyl-functional silane is preferred, and an illustrative coupling agent is N-(beta-aminoethyl)-gamma-amino propyltrimethoxysilane. One such commercially available silane is Z-6020 silane (Dow Corning). A coupling agent, such as a silane, can, if desired, be applied in amount ranging from, for instance, about 0.25 to about 0.5 parts per hundred of the phenolic resin used in preparing the constraining layer, although the amount of coupling agent employed will vary depending on the surface areas involved and the thickness of the respective layers. The amount to be used is readily determinable using suitable test specimens.

Various methods for evaluating the efficiency of the present invention are known and include those described in Seawolf Class Project Peculiar Document No. 802-633 SS72Z, Tiles, Damping, Water Resistant, Fire Retardant, Type VI, (Apr. 30, 1987; Updated Jun. 25, 1987) (unclassified), the complete disclosure of which is hereby incorporated by references.

Vibration damping evaluations were conducted using the vibration damping beam test, and performance tests of MIL-P-23653, among others. The complete disclosure of MIL-P--23653 is incorporated by reference.

Standard steel beam specimens (described elsewhere herein) attenuated with an acoustic and vibration attenuating composite according to the present invention were forced sinusoidally at their mid-points by an electro-mechanical vibrator and the normal modes of three layer beam system were determined. Each beam specimen was then excited at each mode by measuring the decay rate of the response when the force is removed. The measurements were conducted at different temperatures. The data collected show that the damping attenuation characteristics of the composites according to the present invention are at least comparable to the BMI Type VI damping tile represented in PPD-802-6335722.

Examples

The present invention is further described the following non-limiting examples. Examples 1 through 3 relate to preparation of acoustic and vibration attenuation composites according the present invention and their application to a standard steel beam. The specimens were then tested for damping characteristics.

Example 1

Panel #179: The graphite fiber used was IM-7, XSW-370-5H from Hercules Inc. The phenolic resin used was FIRE $PRF_2$ 1000LD from Indespec Chemical Corporation, Pittsburgh, Penn. This is a two component, pre-catalyzed phenol resorcinol-formaldehyde resin system composed of a Component A ($PRF_2$-A) and a Component B ($PRF_2$-RDL). Component A ($PRF_2$-A) was used at 52 parts by weight. Component C, which is an inert filler barium sulfate (Barytes, Pfizer), was mixed with component A at 10 parts by weight, to absorb water in the mix. Component B, which was liquid $PRF_2$-RDL, was added to the mix at 38 parts by weight.

Nitrile rubber, a top surface of which was prepared by light buffing, was placed in a open mold system. Chemlock 7701 was brushed on top surface and was allowed to flash away for 30 minutes.

The composite constraining layer was then fabricated on top of the top surface of the nitrile rubber sheet by hand lay up technique using graphite fiber and phenolic resin. 8 plys of graphite fabric in quasi isotropic lay up were stacked up using 40/60 ratio of fiber and resin by weight. The acoustic and vibration attenuation composite was cured at room temperature overnight. To shorten the curing time, it was then post cured at 50 degrees C. for 4 hours in a convection oven.

The thus prepare acoustic and vibration attenuation composite was bonded to a standard steel beam for vibration testing. 3 strips of graphite/phenolic, 12×3.75 inches and 1 strip of 6 ×3.75 inches, were bonded to steel beam using TA-30 epoxy adhesive. The steel beam was first cleaned with methylethyl ketone and the bottom surface of the nitrile rubber sheet was surface prepared with Chemlock 7701 before the adhesive was applied to the steel beam. The adhesive was cured at room temperature for 24 hours.

Example 2

Panel #184: The graphite fiber used was IM-7, SXW-370-5H from Hercules Inc. The liquid phenolic resin used was Cellobond RJ 2027L from B.P. Chemicals, Cleveland, Ohio. This is a two component, acid catalyzed resin system, wherein Component A (2027L) was used at 90 parts by weight, and Component B ("Phencat 10", an acid catalyst) was mixed with component A at 7 parts by weight.

Nitrile rubber, a top surface of which was prepared by light sanding, was placed in a open mold system. Chemlock 7701 was brushed on top surface and was allowed to flash away for 30 minutes.

The composite constraining layer was then fabricated on top of the top surface of the nitrile rubber sheet by hand lay up technique using graphite fiber and phenolic resin. 8 plys of graphite fabric in quasi isotropic lay up were stacked up using 45/55 ratio of fiber and resin by weight. The acoustic and vibration attenuation composite was cured at room temperature overnight. To shorten the curing time, it was then post cured at 50 degrees C. for 4 hours in a convention oven.

The thus prepared acoustic and vibration attenuation composite was bonded to a steel beam for vibration testing. 3 strips of graphite/phenolic, 12×3.75 inches and 1 strip of 6×3.75 inches, were bonded to steel beam using an epoxy adhesive (TA-30, Philadelphia Resins). The steel beam was cleaned with methylethyl ketone and the bottom surface of the nitrile rubber sheet was surface prepared with Chemlock 7701 before the adhesive was applied to the steel beam. The bottom surface of the above-mentioned attenuation composite was pressed against the steel beam and the adhesive was cured at room temperature for 24 hours.

Example 3

Panel #189: The graphite fiber used was Courtaulds Grafil 33-500 from Courtaulds Graffil, Calif. The liquid phenolic resin used was a two component, acid catalyzed resin system (Cellobond RJ 2027L from B.P. Chemicals, Cleveland, Ohio). Component A (2027L) was used at 90 parts by weight. Component B (Phencat 10) which is an acid catalyst was mixed with component A at 6 parts by weight. A total of 10 plys were used in making a quasi isotropic constraining layer by hand lay up, and the constraining layer was cured using the vacuum bagging technique (22 inches of Hg, 140° F.) for 3 hours followed by a free stand post cure at 140° F. for 2 hours.

Nitrile rubber sheet, a top surface of which prepared by light sanding, was placed in a open mild system. Chemlock 7701 was brushed on top surface and was allowed to flash away for 30 minutes.

The composite constraining layer was then bonded on top of this nitrile rubber sheet by epoxy adhesive, TA-30.

The thus prepared acoustic and vibration composite material was then bonded to a steel beam for vibration testing. 3 strips of graphite/phenolic, 12×3.75" and 1 strip of 6×3.75" were bonded to steel beam using an epoxy adhesive (TA-30, Philadelphia Resins). The steel beam was first cleaned with methylethyl ketone and the nitrile rubber was surface prepared with Chemlock 7701. The adhesive was cured at room temperature for 24 hours.

Testing for Damping Characteristics

The test beams of Examples 1, 2 and 3 were evaluated to determine the damping behavior of effectiveness of the present modified Type VI class 1 damping treatment using the present acoustic and vibration attenuation composites.

Damping behavior was measured by the method specified in MIL-P-23653C(SHIPS) "Plastic Tiles, Vibration Damping" the disclosure of which is incorporated herein by reference. This is a resonant beam technique that uses the free decay of the natural modes of a standard steel beam/damping treatment to measure the system loss factor of the damped beam at each of the normal modes of the standard steel beam.

. The standard steel beams in Examples 1-3 were is 3"×40"×0.375" and were made of cold rolled steel. In each of Examples 1-3, the viscoelastic material-constraining layer material damping tile was attached to the 3"×40" face of the beam by an epoxy adhesive. The complete resonant beam specimen was then suspended horizontally by supporting cords, but with the 3"×40" faces vertical, such that the supporting cords are located at the two nodal points of the first vibration mode of the beam. An electro-mechanical vibration (shaker with a force gauge and accelerometer) was coupled mechanically to the geometrical center of the beam and the beam is excited with a sine wave source via the generator.

The normal modes of the beam were then determined by swept sine excitation. Each normal mode was then excited in turn by a steady state sine wave force at the resonance frequency until equilibrium. The oscillation was then cut off and the free decay of the response of the beam was captured by signal analysis electronics and the damping was determined from the free decay using the "log-decrement" method as given in MIL-P-23653C(SHIPS) "Plastic Tiles, Vibration Damping".

Figure 1:
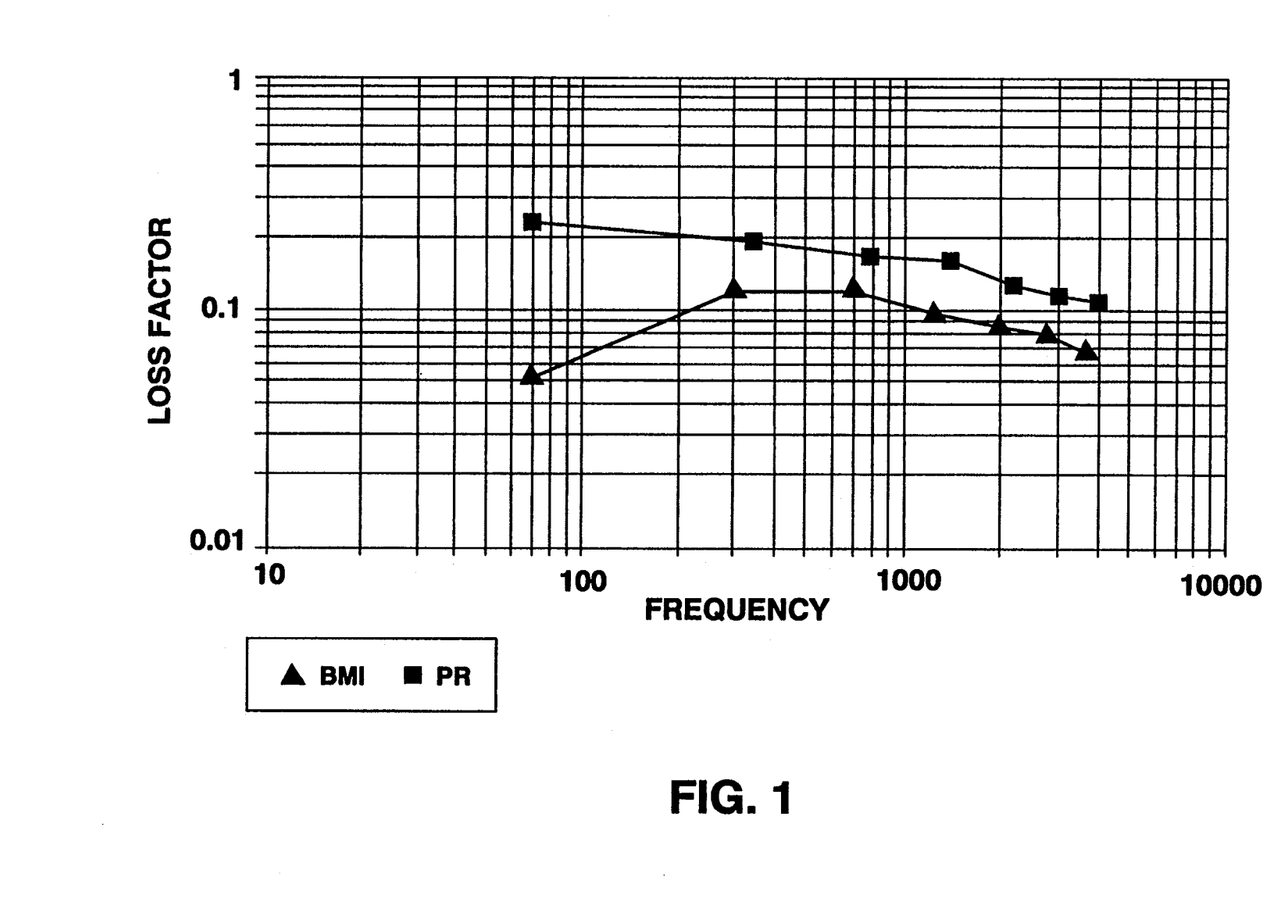
FIGS. 1–3 respectively report damping characteristics a composite according to the present invention at 35° F., versus a known composite having a bismaleimide-based constraining layer.
Figure 2:
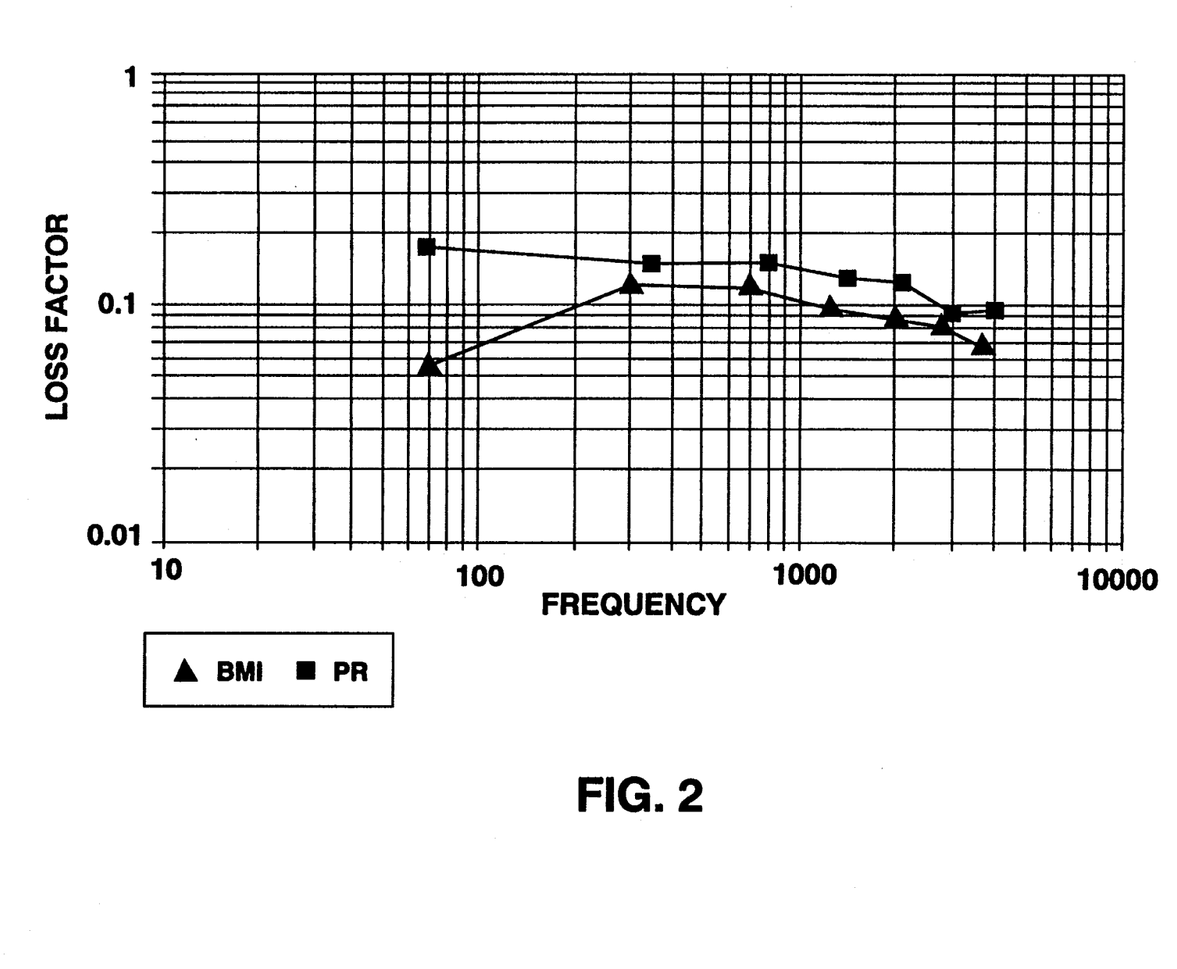
Figure 3:
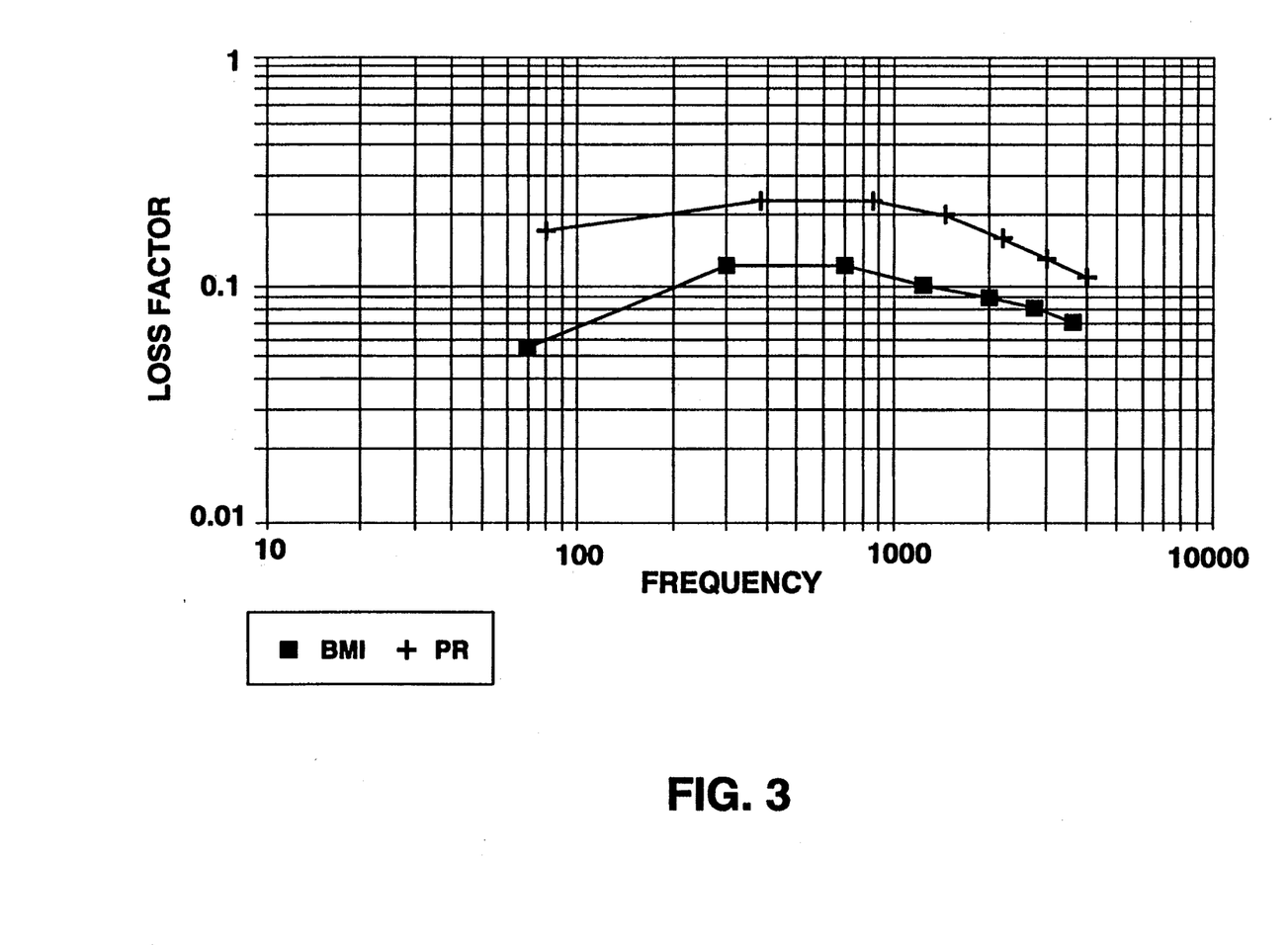
Figure 4:
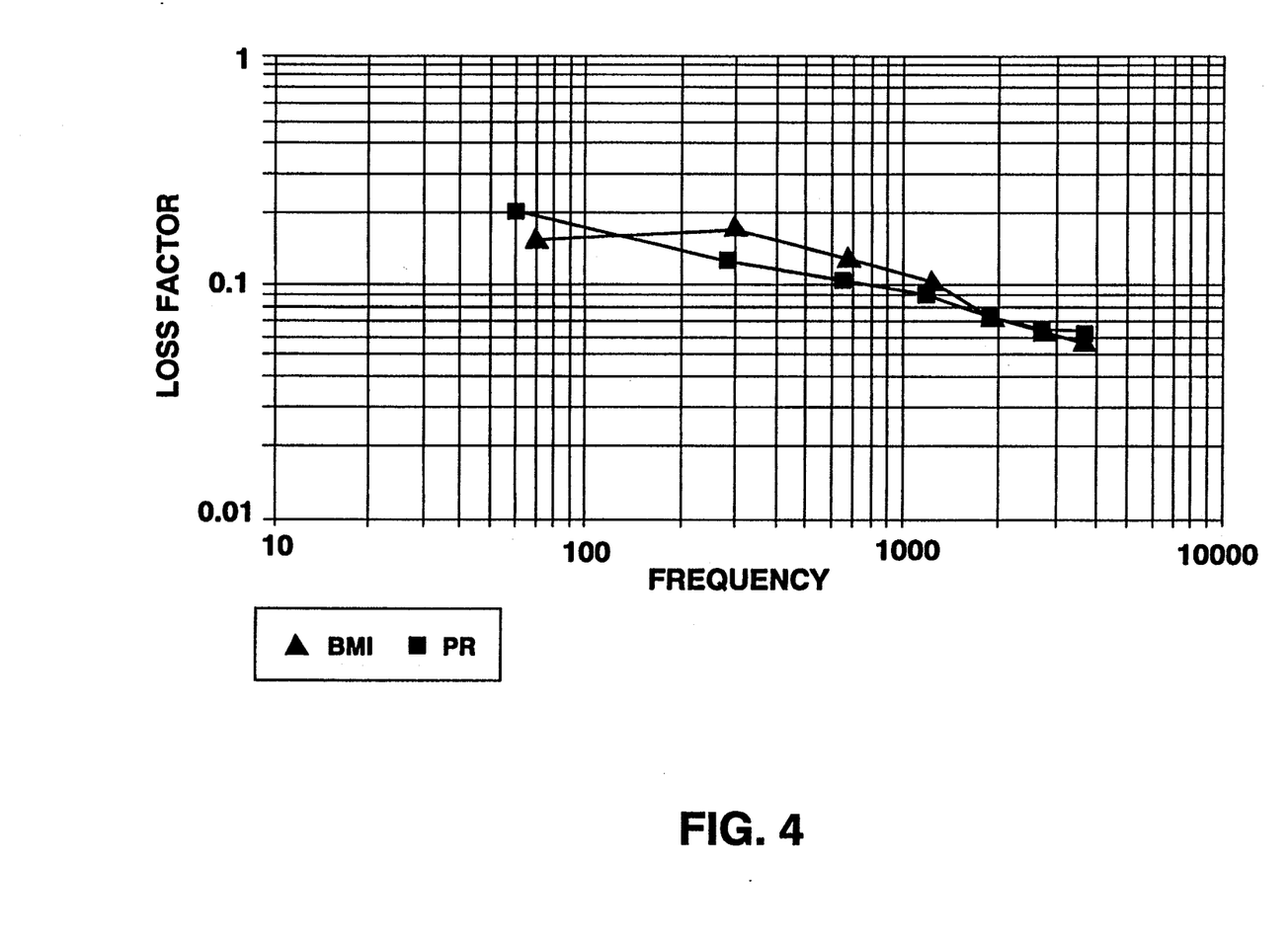
FIGS. 4–6 respectively report damping characteristics of a composite according to the present invention at 55° F., versus a known composite having a bismaleimide-based constraining layer.
Figure 5:
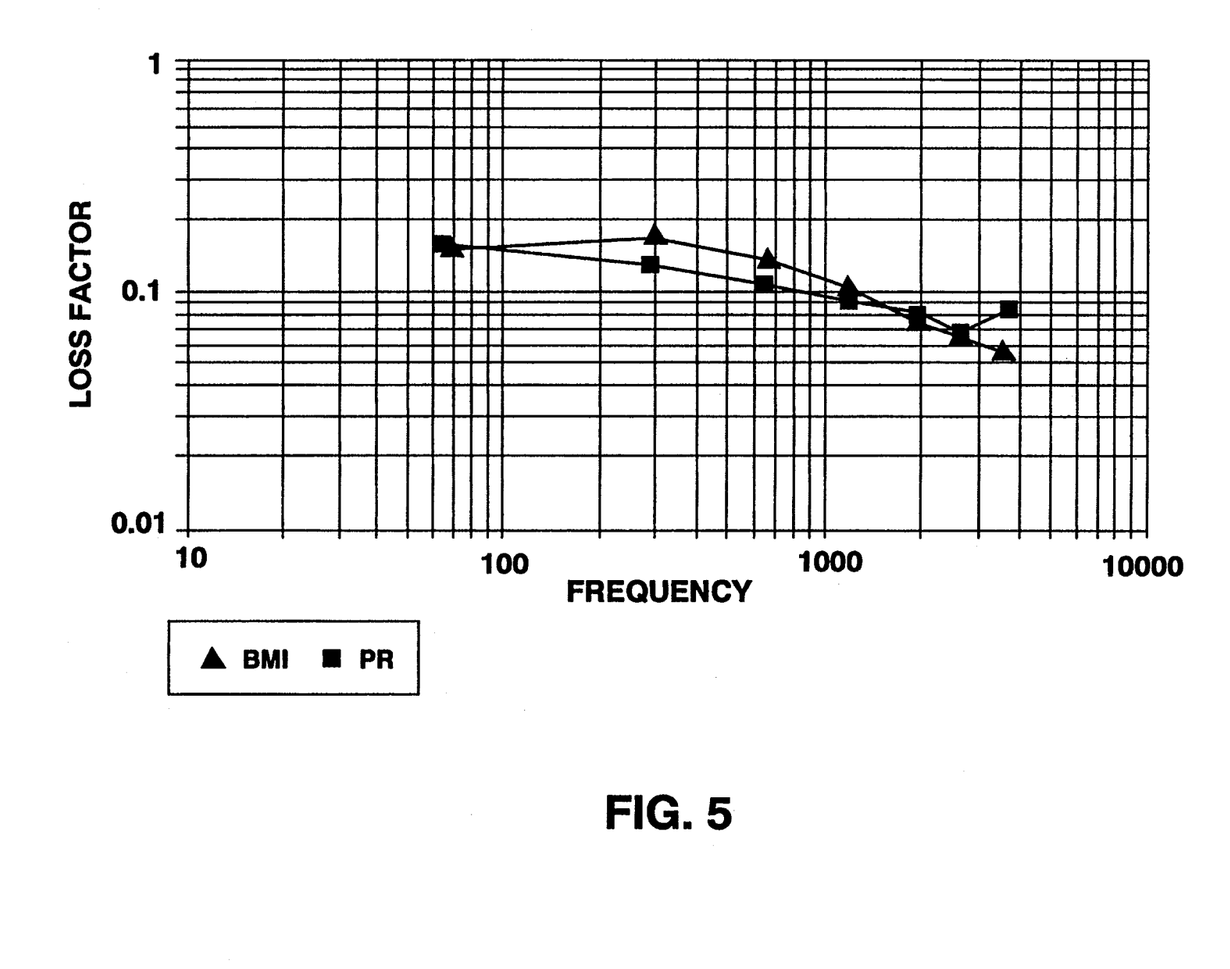
Figure 6:
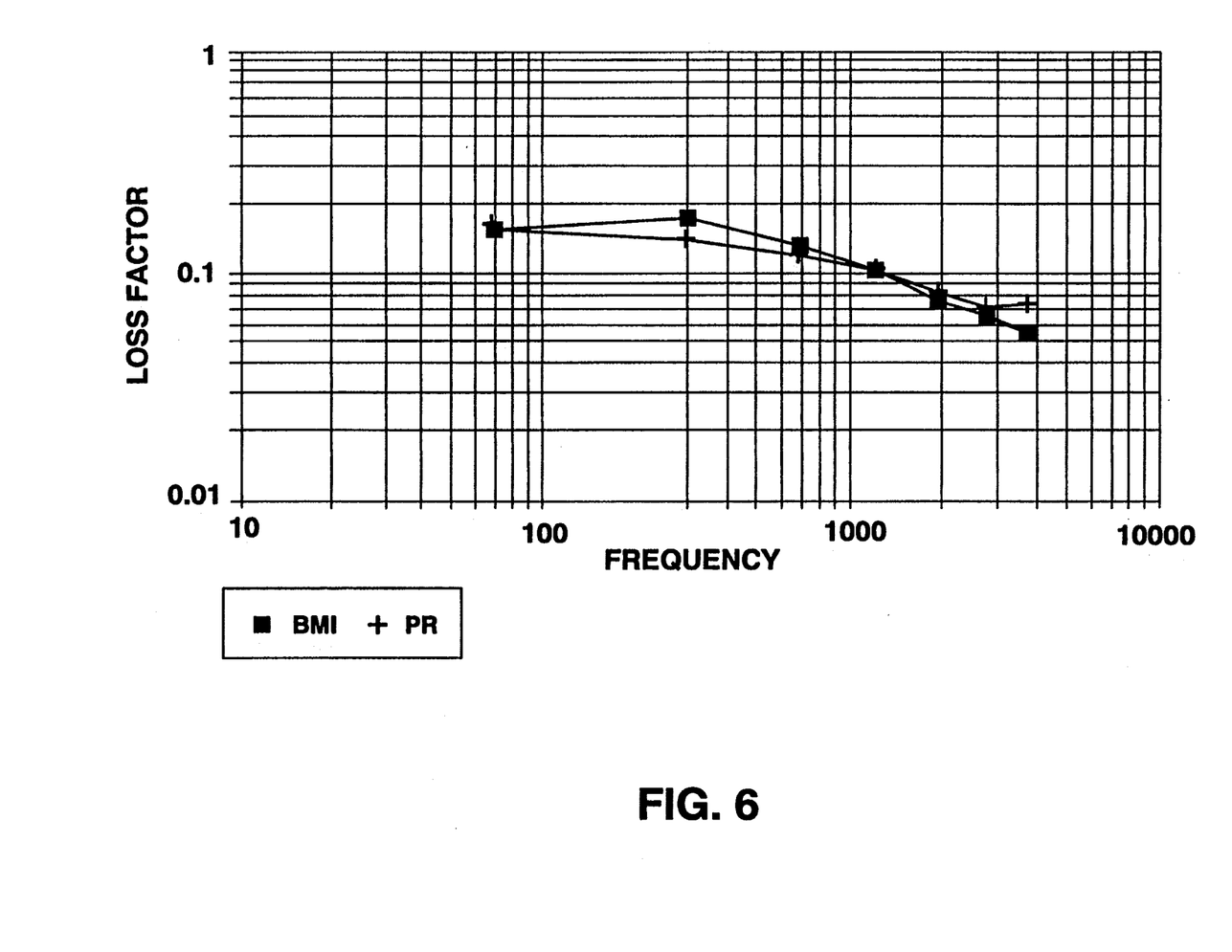
Figure 7:
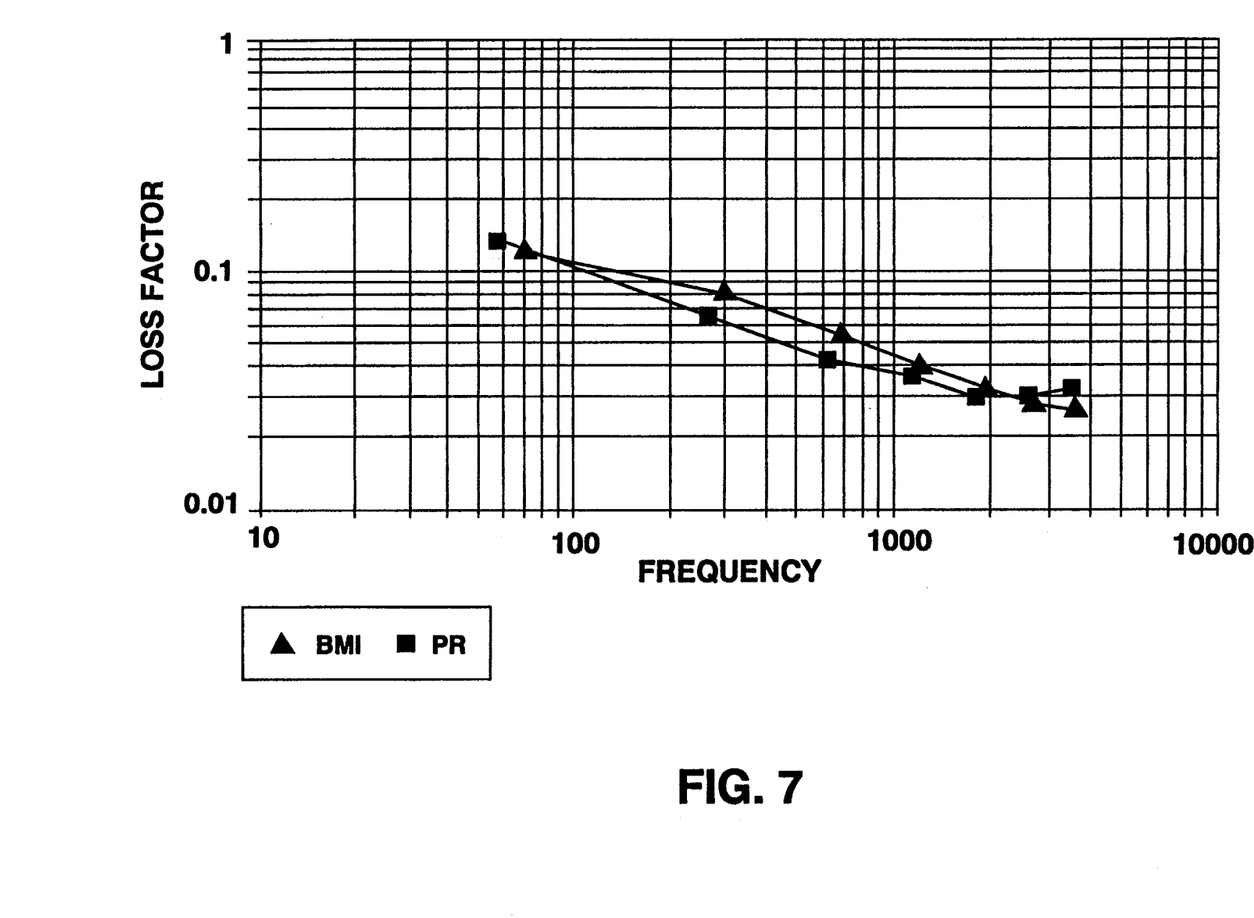
FIGS. 7–9 report damping characteristics of a composite according to the present invention at 75° F., versus a known composite having a bismaleimide-based constraining layer.
Figure 8:
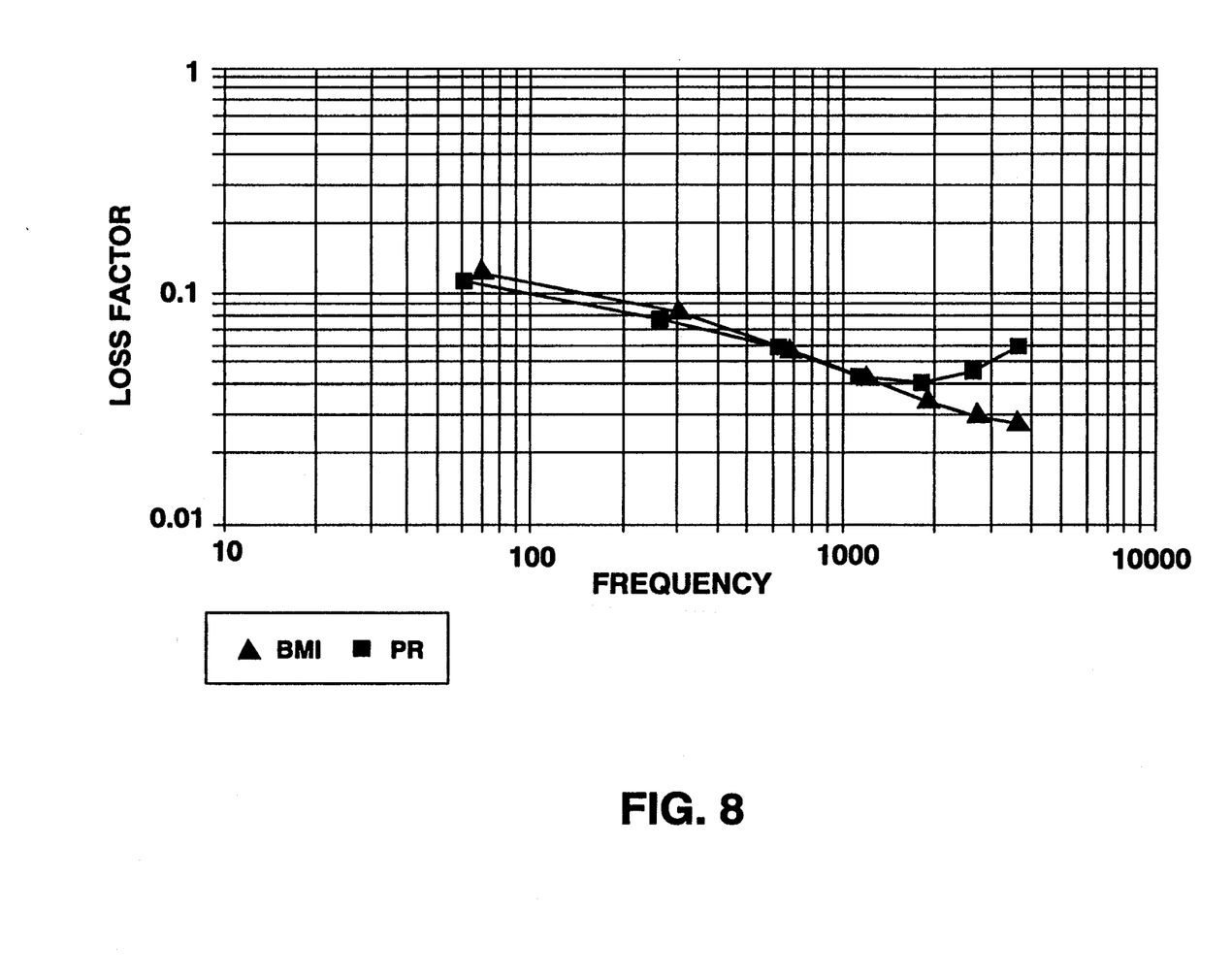
Figure 9:
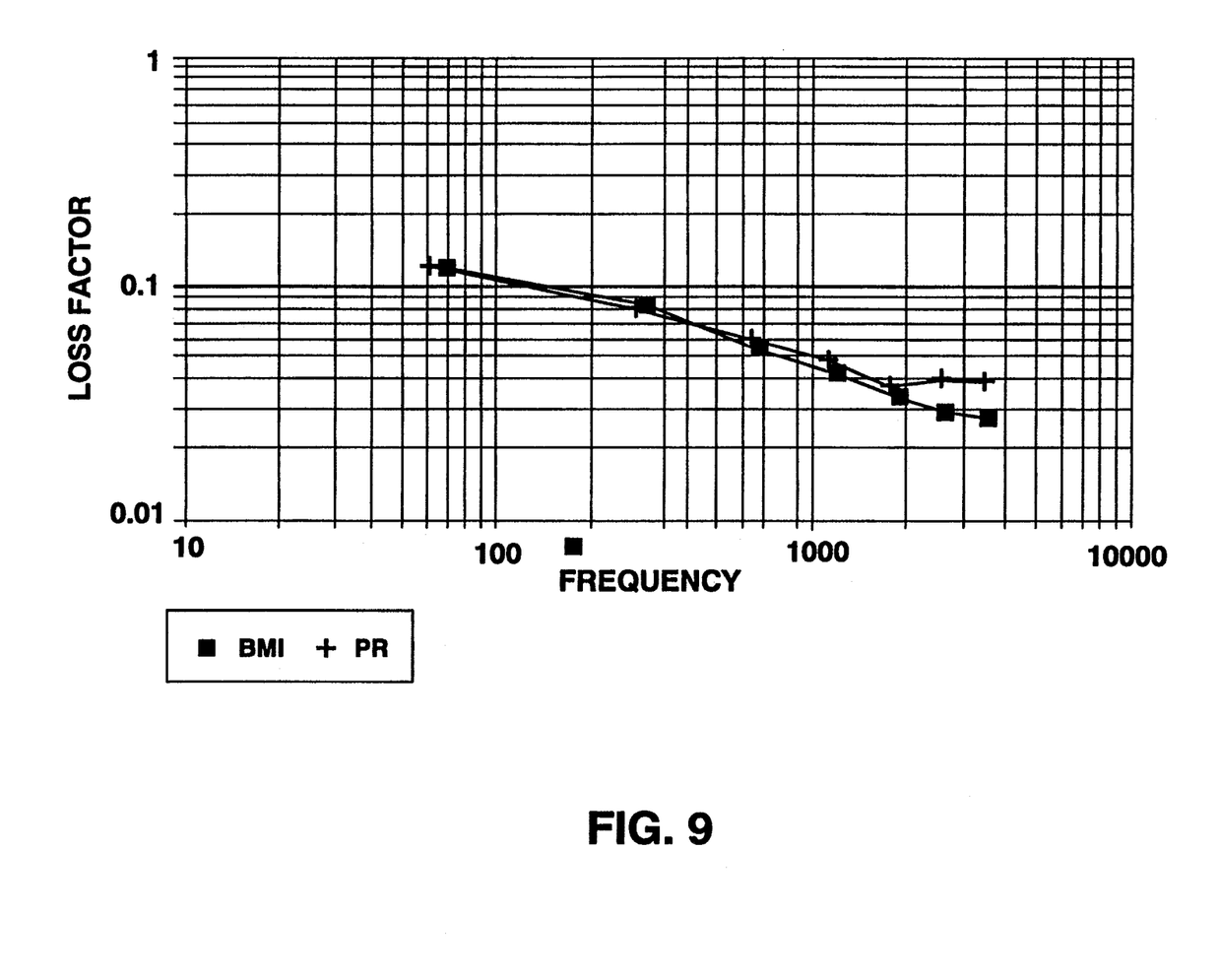

The FIGS. 1–9 present the results of vibration damping tests conducted on each specimen produced according to Examples 1, 2 and 3 at three different temperatures: 35° F., 55° F., and 75° F.

The two lower temperatures were selected because Type VI Class 1 damping treatment is designed for the temperature range of 35° F. to 55° F. The 75 degree data was taken to match the SEAWOLF CLASS PROJECT PECULIAR DOCUMENT NO. 802-6335722 "Tiles, Damping, Water Resistant, Fire Retardant, Type VI" Nov. 28, 1988 tables.

Each test specimen produced in accordance with Example 1, 2 and 3 exhibited damping properties at 35° F. superior to the BMI Type VI damping tile. Each test specimen produced in accordance with Example 1, 2 and 3 exhibited comparable damping properties across the frequency range of interest at 55° F. and 75° F. comparable to a BMI Type VI damping tile.

The comparison data for the BMI Type VI Class 1 is taken from SEAWOLF CLASS PROJECT PECULIAR DOCUMENT NO. 802-6335722 "Tiles, Damping, Water Resistant, Fire Retardant, Type VI" Nov. 28, 1988.

Coupled with the lower material and installation costs, the present invention provides a much more cost effective alternative Type VI treatment to the BMI Type VI damping tile.

In FIGS. 1–9, the loss factor is derived from a ratio of the loss of modulus during damping to the storage modulus. The loss factor is thus an indicia of damping capacity, with an increased loss factor indicating more damping capacity.

In FIGS. 1–9, "BMI" means a BMI Type VI damping tile, and "PR" means the Type VI damping tile according to the present invention.

What we claim is:

1. An acoustic and vibration attenuation composite which comprises:
   a viscoelastic layer having a first and second surface; and
   a constraining layer comprising at least one ply of graphite fabric laid-up with curable phenolic resin bonded to one of said surfaces of said viscoelastic layer.

2. An acoustic and vibration attenuation composite according to claim 1, wherein said constraining layer and said viscoelastic layer are chemically bonded together in situ.

3. An acoustic and vibration attenuation composite according to claim 2, wherein at least one surface of said viscoelastic layer is treated with a silane coupling agent, and the constraining layer is applied to and bonded to the silane treated surface.

4. An acoustic and vibration attenuation composite according to claim 1 wherein said phenolic resin comprises an acid-cured phenolic resin or a base-cured phenolic resin.

5. An acoustic and vibration attenuation composite according to claim 4, wherein said phenolic resin cures in a temperature range of 15° C. to 32° C.

6. An acoustic and vibration attenuation composite according to claim 1, wherein said rubber is a nitrile rubber.

7. Acoustic and vibration attenuation composite according to claim 6, wherein said nitrile rubber has a Tg of 10° C.

* * * * *